(12) United States Patent
Hirano

(10) Patent No.: US 6,703,158 B1
(45) Date of Patent: Mar. 9, 2004

(54) CYLINDRICAL STORAGE BATTERY

(75) Inventor: Fujio Hirano, Hiratsuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 266 days.

(21) Appl. No.: 09/869,413

(22) PCT Filed: Nov. 16, 2000

(86) PCT No.: PCT/JP00/08089

§ 371 (c)(1),
(2), (4) Date: Jun. 28, 2001

(87) PCT Pub. No.: WO01/39298

PCT Pub. Date: May 31, 2001

(30) Foreign Application Priority Data

Nov. 26, 1999 (JP) ............................................ 11-336619

(51) Int. Cl.[7] .......................... H01M 4/00; H01M 6/10; H01M 2/18; H01M 2/02; H01M 6/08
(52) U.S. Cl. .......................... 429/94; 429/133; 429/164
(58) Field of Search .......................... 429/94, 161, 164, 429/133, 233

(56) References Cited

U.S. PATENT DOCUMENTS 6,010,801 A * 1/2000 Nakamaru et al. .......... 429/161
6,013,389 A * 1/2000 Nakamaru et al. .......... 429/161
6,249,940 B1 * 6/2001 Asano et al. ...................... 29/2
6,432,585 B1 * 8/2002 Kawakami et al. ......... 429/233

FOREIGN PATENT DOCUMENTS

| EP | 0380803 | 8/1990 |
| EP | 0878855 | 11/1998 |
| JP | 58-74768 | 5/1983 |

* cited by examiner

Primary Examiner—Bruce F. Bell
Assistant Examiner—Donald V. Scaltrito
(74) Attorney, Agent, or Firm—Stevens, Davis, Miller & Mosher, LLP

(57) ABSTRACT

A cylindrical storage battery comprises a spirally coiled electrode plate assembly which includes positive and negative electrode plates spirally wound with a separator interposed therebetween. Upper and lower current collectors are welded to the upper and lower ends of the electrode plate assembly. The electrode plate assembly and the current collectors are housed in a metal casing, and an upper end of the casing is closed by a sealing plate. The upper current collector and the sealing plate are electrically connected through a lead terminal which is securely and reliably connected to the sealing plate. The lead terminal has one end portion formed with a hole, and this hole is fitted on a projected portion formed on a lower surface of the sealing plate. Around the portion of the lead terminal surrounding the hole is formed a projection or projections which is/are welded to the lower surface of the sealing plate.

3 Claims, 7 Drawing Sheets

CYLINDRICAL STORAGE BATTERY

TECHNICAL FIELD

This invention relates to a cylindrical storage battery provided with a spirally coiled electrode plate assembly, and more particularly to an alkaline storage battery for use as a drive power source of a vehicle, in which a lead terminal, electrically connecting a current collector, welded to an upper portion of the electrode plate assembly, to a sealing plate, is improved so as to enable charge and discharge with a large electric current and also to achieve excellent vibration-resistant properties.

BACKGROUND ART

Cylindrical storage batteries, represented by a nickel-cadmium storage battery and a nickel-metal hydride storage battery, have been widely used as a power source of a mobile phone, a laptop personal computer and so on because of their high reliability and easy maintenance. In recent years, there has been an increasing demand for the type of cylindrical storage battery suited for large-current discharge so as to be used as a power source of an electrically-operated tool, a power-assisted bicycle, an electric car and so on.

A cylindrical storage battery is formed by spirally winding a strip-shaped positive electrode plate and a strip-shaped negative electrode plate, with a separator interposed therebetween, to provide an electrode plate assembly, then by inserting this assembly, together with an electrolyte, into a casing made of metal, and then by closing an opening of this casing in a sealed manner.

In the type of alkaline storage battery used for discharging large current, a positive electrode plate and a negative electrode plate are wound in such a manner that an upper end portion of one of the positive and negative electrode plates projects upwardly from an upper end of an electrode plate assembly while a lower end portion of the other electrode plate projects downwardly from a lower end of the electrode plate assembly, and current collectors of a rectangular or a circular shape are welded respectively to the upwardly-projecting distal end and downwardly-projecting distal end of the two electrode plates at a plurality of spots, thereby enhancing the ability to collect electric current from the electrode plates. However, a resistance drop develops particularly at a lead terminal, connecting the electric collector to a sealing plate, thus inviting a problem that the operating voltage of the battery decreases, and besides there has been a possibility that the sealing plate and the lead terminal portion are disengaged from each other upon application of severe vibration and impact.

Figure 9:
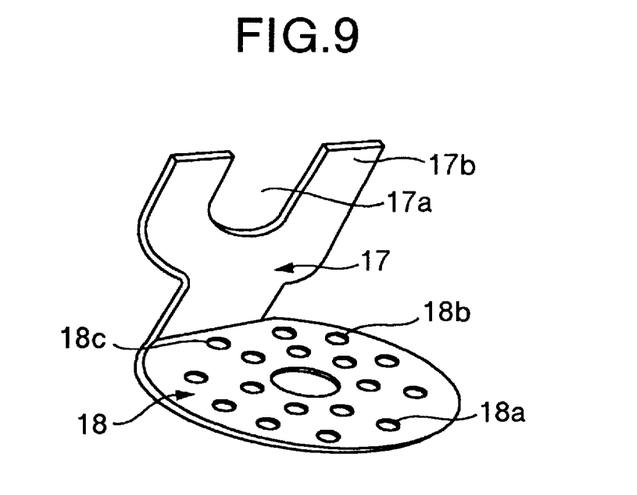
FIG. 9 is a schematic view showing a conventional lead terminal of the current collector-incorporating type.
Figure 10:
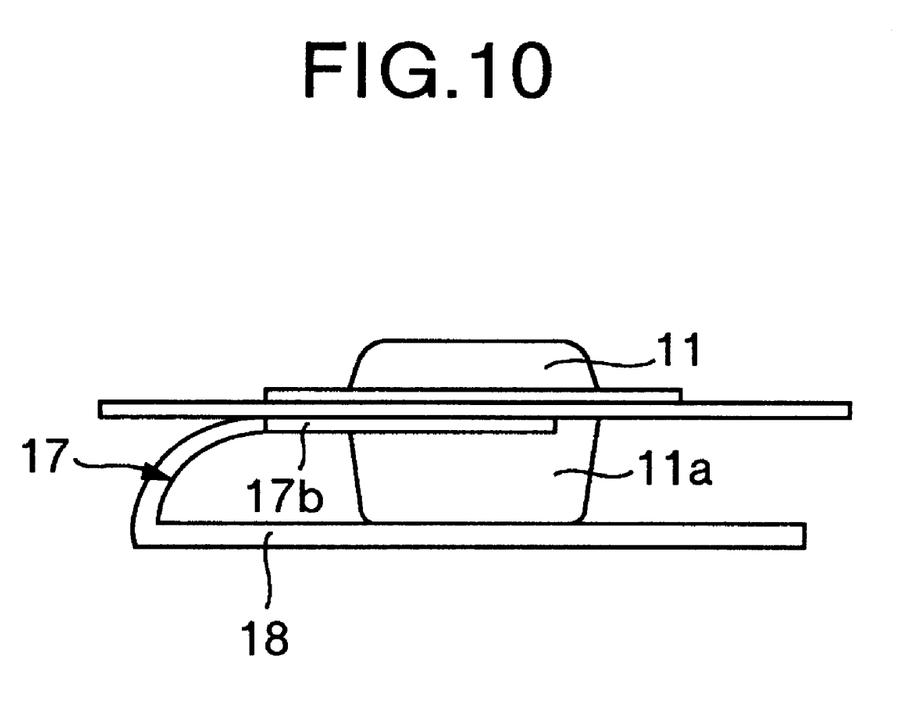
FIG. 10 is a schematic view showing the conventional lead terminal secured to a sealing plate.

For example, FIG. 9 shows a horseshoe-shaped lead terminal 17 (disclosed in Japanese Utility Model Laid-Open Publication No. 58-74768) connected to a sealing plate 11 as shown in FIG. 10. The positioning of the lead terminal 17 is effected by loosely fitting its opening portion 17a on a projected portion 11a of the sealing plate 11 in contacted relation thereto, and a horseshoe portion 17b of the lead terminal 17 is connected to the sealing plate 11 by spot welding as shown in FIG. 10 which is a schematic, cross-sectional view. In this case, the lead terminal 17 is formed integrally with an electric collector 18.

In the structure shown in FIG. 9, however, when positioning the horseshoe portion 17b of the lead terminal 17 relative to the projected portion 11a of the sealing plate 11, this positioning can not be effected accurately unless the proximal end portion of the opening portion is held in contact with the projected portion 11a. Therefore, if even a slight displacement occurs, variations in the spot welded positions and an incompletely-welded condition are encountered. And besides, the lead terminal 17 has a horseshoe-shape, and therefore is not held against a side surface of the projected portion 11a, and therefore a load acts directly on the spot welded portions upon being subjected to vibrations, so that the spot welded portions are broken. Furthermore, the lead terminal 17 and the current collector 18 are formed into an integral construction, and the lead terminal 17 is formed on the outer peripheral edge of the current collector 18, and therefore particularly a current collecting portion 18a (of the current collector 18 connected to the electrode plate) remotest from the lead terminal 17 has a longer path of flow of electric current as compared with other current collecting portions 18b and 18c, and this causes the increase of an internal resistance of the battery.

DISCLOSURE OF THE INVENTION

In order to solve the above problems, the present invention provides a cylindrical storage battery which comprises current collectors, welded respectively to distal ends of strip-shaped positive and negative electrode plates projecting upwardly and downwardly respectively from a spirally coiled electrode plate assembly including the electrode plates and a separator, and a lead terminal connecting one of the current collectors to a sealing plate. In this storage battery, a hole is formed through one end portion of the lead terminal to be connected to the sealing plate, and this hole is fitted on a projected portion of the sealing plate. In one method, that portion of the lead terminal, surrounding this hole, is fixedly secured to the reverse surface of the sealing plate by laser welding. In another method, a plurality of projections or a ring-shaped projection are formed on that portion of the lead terminal surrounding the hole, and the projection or projections is/are secured to the reverse surface of the sealing plate. With this construction, the positioning of the lead terminal and the sealing plate relative to each other can be carried out easily, and therefore the welding connection can be effected in a stable manner, and besides this structure can withstand severe vibrations.

Further, a hole or a notch is formed through the other end portion of the lead terminal to be welded to the current collector, and that portion of the lead terminal, surrounding this hole, is held against a central portion of a flat plate portion of the current collector. In this case, the central portion is spaced from the center by a distance not larger than a half of the distance between the center and the outer peripheral edge. In one method, the portion of the lead terminal, surrounding the hole or the notch, is secured to the flat plate portion of the current collector by laser welding. In another method, a plurality of projections or a ring-shaped projection are formed on this portion surrounding the hole, and the projection or projections is/are secured to the current collector. With such construction, the paths of flow of electric current from current-collecting portions of the current collector, welded to the electrode plate, to the lead terminal, can be made shortest.

According to one aspect of the invention, there is provided a cylindrical storage battery comprising: an electrode plate assembly including a pair of strip-shaped positive and negative electrode plates and a separator which are spirally wound in such a manner that a distal end portion of one of the electrode plates projects upwardly from the electrode plate assembly while a distal end portion of the other electrode plate projects downwardly from the electrode plate assembly; a pair of upper and lower current collectors welded respectively to the distal end portions of the electrode plates, each of the current collectors being in the form of a flat plate of a substantially rectangular or a substantially circular shape; a metal casing containing the electrode plate assembly, the current collectors and an alkaline electrolyte therein; a sealing plate closing an upper end of the casing in a sealed manner; and a lead terminal electrically connecting the upper current collector to the sealing plate; wherein a projected portion is formed on a lower surface of the sealing plate, one end portion of the lead terminal has a hole fitted on the projected portion of the sealing plate, a projection is formed on that portion of the lead terminal surrounding the hole, and is welded to the lower surface of the sealing plate, and the other end portion of the lead terminal is welded to the upper current collector.

With such construction, the hole in the one end portion of the lead terminal is fitted on the projected portion of the sealing plate, and the projection on the lead terminal is welded to the lower surface of the sealing plate. Therefore, the displacement of the lead terminal and the sealing plate relative to each other will not occur, and therefore the welding connection between the two can be carried out in a stable manner, and besides even when a large impact and vibrations are applied to the battery, the welded portion, connecting the lead terminal and the sealing plate together, will not be broken, and therefore there can be provided the battery which exhibits the excellent reliability for a long period of time.

According to another aspect of the invention, there is provided a cylindrical storage battery comprising: an electrode plate assembly including a pair of strip-shaped positive and negative electrode plates and a separator which are spirally wound in such a manner that a distal end portion of one of the electrode plates projects upwardly from the electrode plate assembly while a distal end portion of the other electrode plate projects downwardly from the electrode plate assembly; a pair of upper and lower current collectors welded respectively to the distal end portions of the electrode plates, each of the current collectors being in the form of a flat plate of a substantially rectangular or a substantially circular shape; a metal casing containing the electrode plate assembly, the current collectors and an alkaline electrolyte therein; a sealing plate closing an upper end of the casing in a sealed manner; and a lead terminal electrically connecting the upper current collector to the sealing plate; wherein a projected portion is formed on a lower surface of the sealing plate, one end portion of the lead terminal has a hole fitted on the projected portion of the sealing plate, a projection is formed on that portion of the lead terminal surrounding the hole, and is welded to the lower surface of the sealing plate, one of a hole and a notch is formed through the other end portion of the lead terminal and a projection is formed on that portion of the lead terminal surrounding one of the hole and the notch, and is welded to the upper current collector.

With such construction, the hole in the one end portion of the lead terminal is fitted on the projected portion of the sealing plate, and therefore the lead terminal can be fixed, and also the projection around the hole of the lead terminal can be welded to the lower surface of the sealing plate in a stable manner, and the projection on the lead terminal is welded to the sealing plate, and therefore the strong welding can be achieved. And besides, the hole or the notch is formed through the other end portion of the lead terminal, and the projection is formed on that portion of the lead terminal surrounding this hole or notch, and is welded to the upper current collector, and welding current concentrates on this projection so that the upper current collector and the projection of the lead terminal can b welded together with a high strength. Thus, even when a large impact and vibrations are applied to the battery, the welded portion, connecting the lead terminal and the sealing plate together, and the welded portion, connecting the upper current collector and the lead terminal together, and will not be broken, and therefore there can be provided the cylindrical battery which exhibits the excellent reliability for a long period of time.

According to a further aspect of the invention, there is provided a cylindrical storage battery comprising: an electrode plate assembly including a pair of strip-shaped positive and negative electrode plates and a separator which are spirally wound in such a manner that a distal end portion of one of the electrode plates projects upwardly from the electrode plate assembly while a distal end portion of the other electrode plate projects downwardly from the electrode plate assembly; a pair of upper and lower current collectors welded respectively to the distal end portions of the electrode plates, each of the current collectors being in the form of a flat plate of a substantially rectangular or a substantially circular shape; a metal casing containing the electrode plate assembly, the current collectors and an alkaline electrolyte therein; a sealing plate closing an upper end of the casing in a sealed manner; and a lead terminal electrically connecting the upper current collector to the sealing plate; wherein a projected portion is formed on a lower surface of the sealing plate, one end portion of the lead terminal has a hole fitted on the projected portion of the sealing plate, a projection is formed on that portion of the lead terminal surrounding the hole, and is welded to the lower surface of the sealing plate, the upper current collector has a projection, the other end portion of the lead terminal has a second hole fitted on the projection on the upper current collector, and a projection is formed on that portion of the lead terminal surrounding the second hole, and is welded to the upper current collector.

With such construction, the hole in the one end portion of the lead terminal is fitted on the projected portion of the sealing plate, and therefore the lead terminal can be fixed, and also the projection around the hole of the lead terminal can be welded to the lower surface of the sealing plate in a stable manner, and welding current concentrates on the projection on the one end portion of the lead terminal. Thus, the strength of welding connection between this projection and the sealing plate increases. Further, the projection is formed on the upper current collector, and is fitted in the hole in the other end portion of the lead terminal, and therefore the lead terminal can be fixed. And besides, the projection around the hole in the other end portion of the lead terminal can be welded to the upper current collector in a stable manner, and welding current concentrates on the projection on the other end portion of the lead terminal, so that the strength of welding connection between this projection and the upper current collector increases.

BEST MODE FOR CARRYING OUT THE INVENTION

First Embodiment

Figure 1:
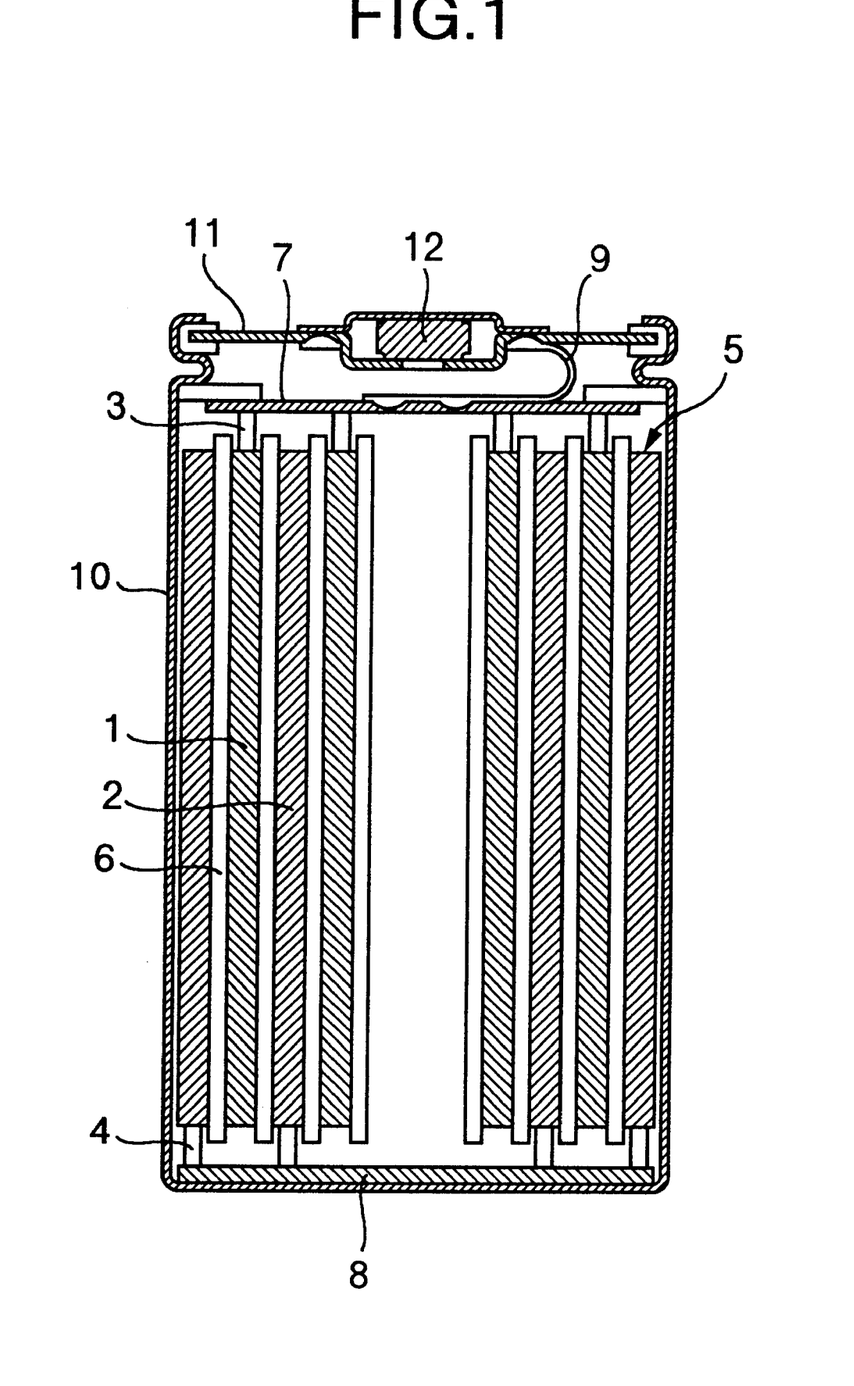
FIG. 1 is a cross-sectional view of a first embodiment of a nickel-cadmium storage battery of the invention.

FIG. 1 is a sectional side view of a first embodiment of a nickel-cadmium storage battery A of the invention. The construction of this battery A will be described below.

A sintered-type nickel positive electrode plate 1 with a thickness of 1.0 mm, provided at its longitudinal edge with an exposed core member 3, and a paste-type cadmium negative electrode plate 2 with a thickness of 0.7 mm, provided at its longitudinal edge with an exposed core member 4, were prepared. The two electrode plates were spirally wound, with a separator 6 interposed therebetween, to provide an electrode plate assembly 5 (having a diameter of 30 mm and a height of 50 mm) such that the exposed core members 3 and 4 project a distance of about 1.5 mm from upper and lower ends of the electrode plate assembly 5, respectively.

An upper rectangular current collector 7 with a diagonal length of 27 mm, having a through hole formed through a central portion thereof, was arranged right above the upper end surface of the electrode plate assembly 5, whereas a lower rectangular current collector 8, which had the same diagonal length as that of the upper current collector 7, and was provided at a central portion thereof with a tongue for welding purposes, was held in contact with the exposed core member 4 provided at the lower end surface of the electrode plate assembly 5. In this condition, the upper and lower current collectors were welded respectively to the exposed core members 3 and 4 at a plurality of spots, using welding electrodes, and a lead terminal 9 was welded to the central portion of the upper current collector 7.

Then, the electrode plate assembly 5 was inserted into a metal casing 10, and a welding electrode was passed through the central hole in the current collector 7 to press the tongue provided at the central portion of the current collector 8, and this pressed part was welded to the inner bottom surface of the metal casing 10.

Then, a predetermined amount of an alkaline electrolyte was poured into the metal casing 10 through the central through hole in the current collector 7. A distal end portion of the lead terminal 9, secured to the current collector 7, was welded to a reverse surface of a sealing plate 11 serving also as a central portion of the flat plate portion 7b of the current collector 7, and therefore the four projections 9c of the lead terminal 9 can be spaced generally the same distance from the protuberances 7d of the current collector 7 which collects electric current from the electrode plate assembly 5, and also the paths of flow of the electric current can be made shortest.

Figure 3:
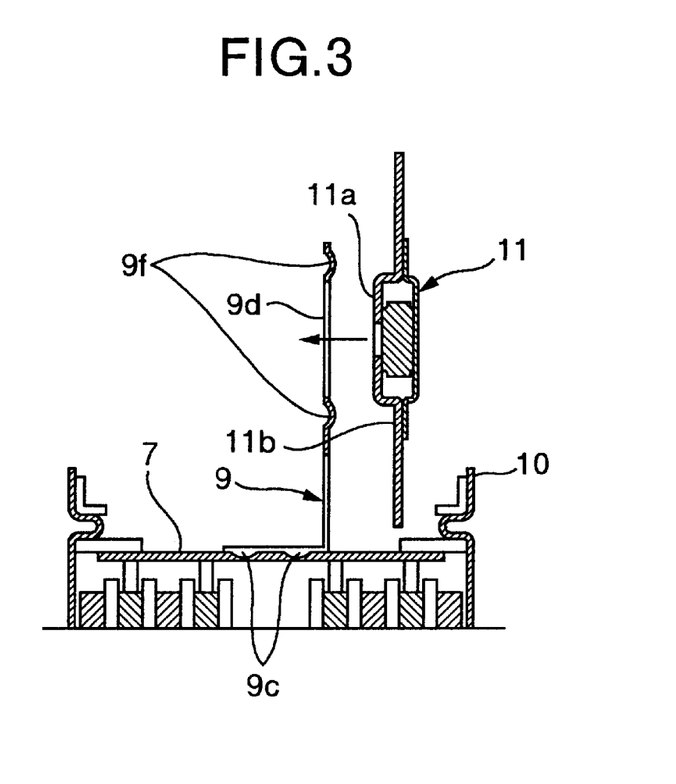
FIGS. 3 to 5 are schematic views showing the manner of assembling an upper portion of the battery.

A hole 9d is formed through the other end portion of the lead terminal 9, and this hole 9d is fitted on a projected portion 11a of the sealing plate 11 containing a safety valve 12, made of rubber, therein. Four projections 9f are formed on that portion 9e of the lead terminal, surrounding the hole 9d, and project toward the lower surface 11b of the sealing plate 11, and these projections 9f are welded to the lower surface 11b of the sealing plate. FIG. 3 is a schematic cross-sectional view showing this construction. In FIG. 3, a part of the lead terminal 9 formed with the projections 9f is shown by cross-sectional view, while the other part of the lead terminal 9 formed with projections 9c is shown by a side view. Each of the projections 9f has the shape shown by the cross-sectional view. It is to be noted that the shape of the projections 9c is similar to the shape of the projections 9f.

The projected portion 11a of the sealing plate 11 is inserted into the hole 9d in the lead terminal 9 in a direction of an arrow, and is fitted positive electrode terminal, and the lead terminal 9 was bent into a U-shape, and an opening of the casing was closed in a sealed manner by the sealing plate 11, thus providing the nickel-cadmium storage battery A. This battery A had a diameter of 33 mm, a height of 61.5 mm and a nominal capacity of 5,000 mAh. Details of the construction of the upper portion of the battery A will be described in the following.

Figure 2:
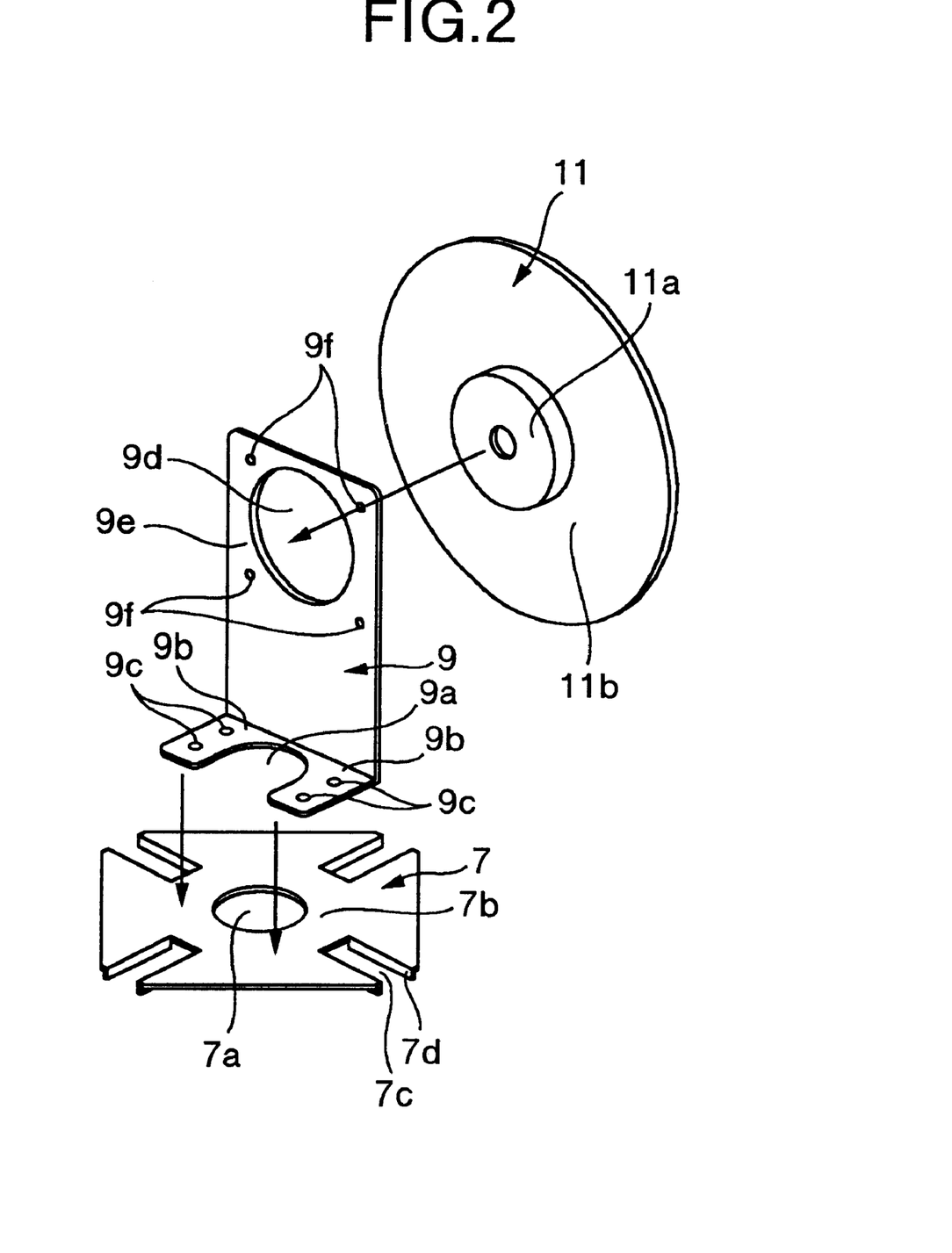
FIG. 2 is a perspective, exploded view showing a sealing plate, a lead terminal and a current collector of the battery.

As shown in FIG. 2 (which is a schematic view), the current collector 7 includes the through hole 7a in the central portion thereof, a flat plate portion 7b, notch portions 7c, and downwardly-projecting protuberances 7d disposed in contiguous relation to the notch portions 7c. A notch portion 9a is formed in one end portion of the L-shaped lead terminal 9 to be welded to the current collector 7, and the area of this notch portion 9a is not smaller than the area of the through hole 7a in the current collector 7. Four projections 9c are formed on that portion 9b of the lead terminal, surrounding the notch portion 9a, and project toward the current collector 7.

The projections 9c of the lead terminal 9 are held against a central portion of the flat plate portion 7b of the current collector 7, and then a welding electrode is pressed against the upper side of each projection 9c of the lead terminal 9, and welds the same to this flat plate portion. Thus, the projections 9c of the lead terminal 9 are welded to the thereinto until the projections 9f of the lead terminal 9 are brought into contact with the lower surface 11b of the sealing plate 11, and in this condition, a welding electrode is pressed against the upper side of each projection 9f, and welds the same to the sealing plate. By doing so, the sealing plate 11 and the lead terminal 9 can be positively positioned relative to each other, and the welding can be effected in a stable manner, and therefore the reliability of the welding is greatly enhanced. And besides, the lead terminal 9 is welded to the sealing plate 11 in such a manner that the lead terminal 9 surrounds the projected portion 11a of the sealing plate 11 over an entire periphery thereof, and therefore even when strong vibrations are applied to the battery, the welded portions will not be broken.

Figure 4:
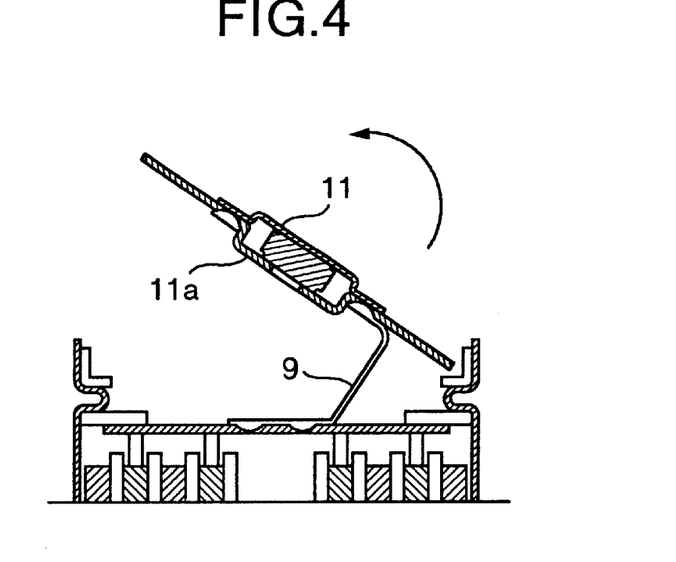
Figure 5:
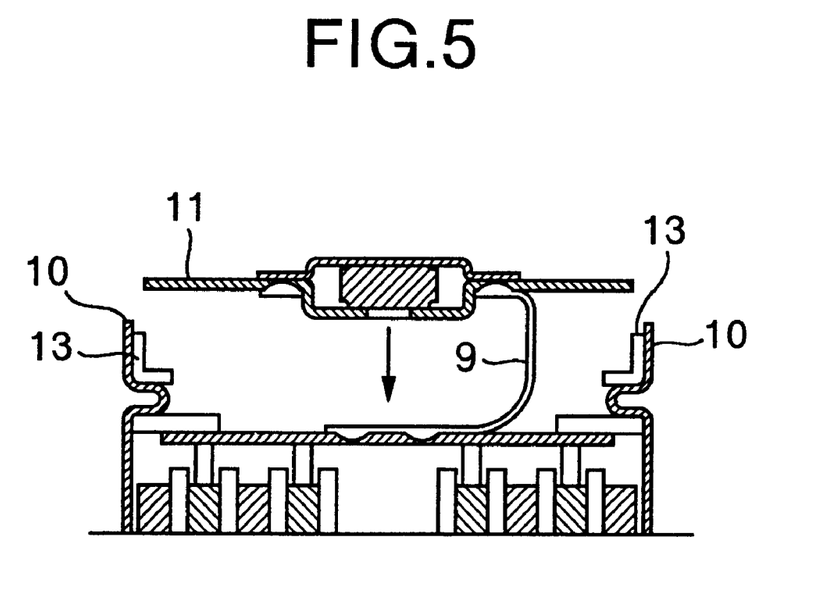
Figure 6:
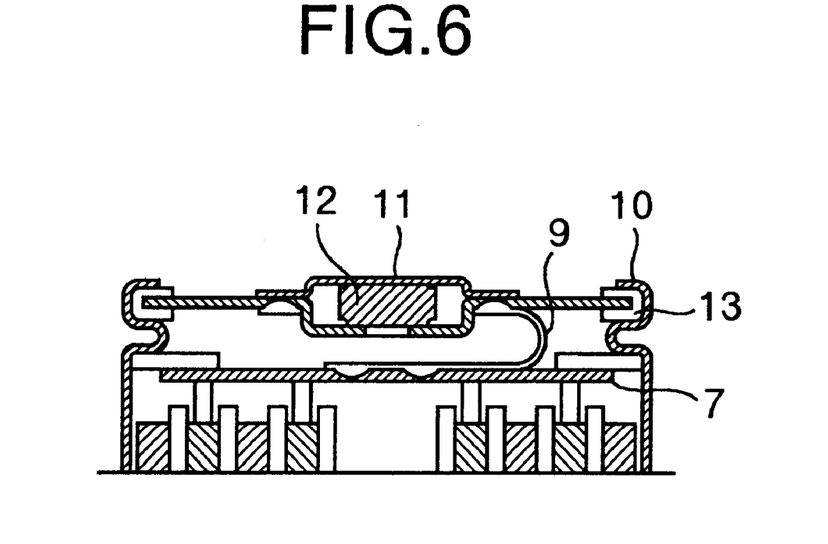
FIG. 6 is a cross-sectional view of the assembled upper portion of the battery.

Then, the lead terminal 9 is bent in a direction of an arrow, as shown in FIG. 4, such that the sealing plate 11 is disposed parallel to the upper surface of the casing 10 as shown in FIG. 5. There-after, the sealing plate 11 is fitted into a gasket 13 made of polypropylene, and the upper end of the casing is bent inwardly to thereby close the opening of this casing in a sealed manner, thus providing the nickel-cadmium storage battery A as shown in FIG. 6.

Second Embodiment

A second embodiment of a nickel-cadmium storage battery B, which is similar in construction to the first embodiment except the construction of an upper current collector 14 and a lead terminal 15, shown in FIG. 7, will be described.

A sintered-type nickel positive electrode plate 1 with a thickness of 1.0 mm, provided at its longitudinal edge with an exposed core member 3, and a paste-type cadmium negative electrode plate 2 with a thickness of 0.7 mm, provided at its longitudinal edge with an exposed core member 4, were prepared. The two electrode plates were spirally wound, with a separator 6 interposed therebetween, to provide an electrode plate assembly 5 (having a diameter of 30 mm and a height of 50 mm) such that the exposed core members 3 and 4 project a distance of about 1.5 mm from upper and lower ends of the electrode plate assembly 5, respectively.

The upper rectangular current collector 14 with a diagonal length of 27 mm, having a through hole formed through a central portion thereof, was arranged right above the upper end surface of the electrode plate assembly 5, whereas a lower rectangular current collector 8, which had the same diagonal length as that of the upper current collector 14, and was provided at a central portion thereof with a tongue for welding purposes, was held in contact with the exposed core member 4 provided at the lower end surface of the electrode plate assembly 5. In this condition, the upper and lower current collectors were welded respectively to the exposed core members 3 and 4 at a plurality of spots, using welding electrodes, and the lead terminal 15 was welded to the central portion of the upper current collector 14.

Then, the electrode plate assembly 5 was inserted into a metal casing 10, and a welding electrode was passed through the central hole in the current collector 14 to press the tongue provided at the central portion of the current collector 8, and this pressed part was welded to the inner bottom surface of the metal casing 10.

Then, a predetermined amount of an alkaline electrolyte was poured into the metal casing 10 through the central through hole in the current collector 14. A distal end portion of the lead terminal 15, secured to the current collector 14, was welded to a lower surface of a sealing plate 11 serving also as a positive electrode terminal, and the lead terminal 15 was bent into a U-shape, and an opening of the casing was closed in a sealed manner by the sealing plate 11, thus providing the nickel-cadmium storage battery B. This battery B had a diameter of 33 mm, a height of 61.5 mm and a nominal capacity of 5,000 mAh. Details of the construction of the upper portion of the battery B will be described in the following.

Figure 7:
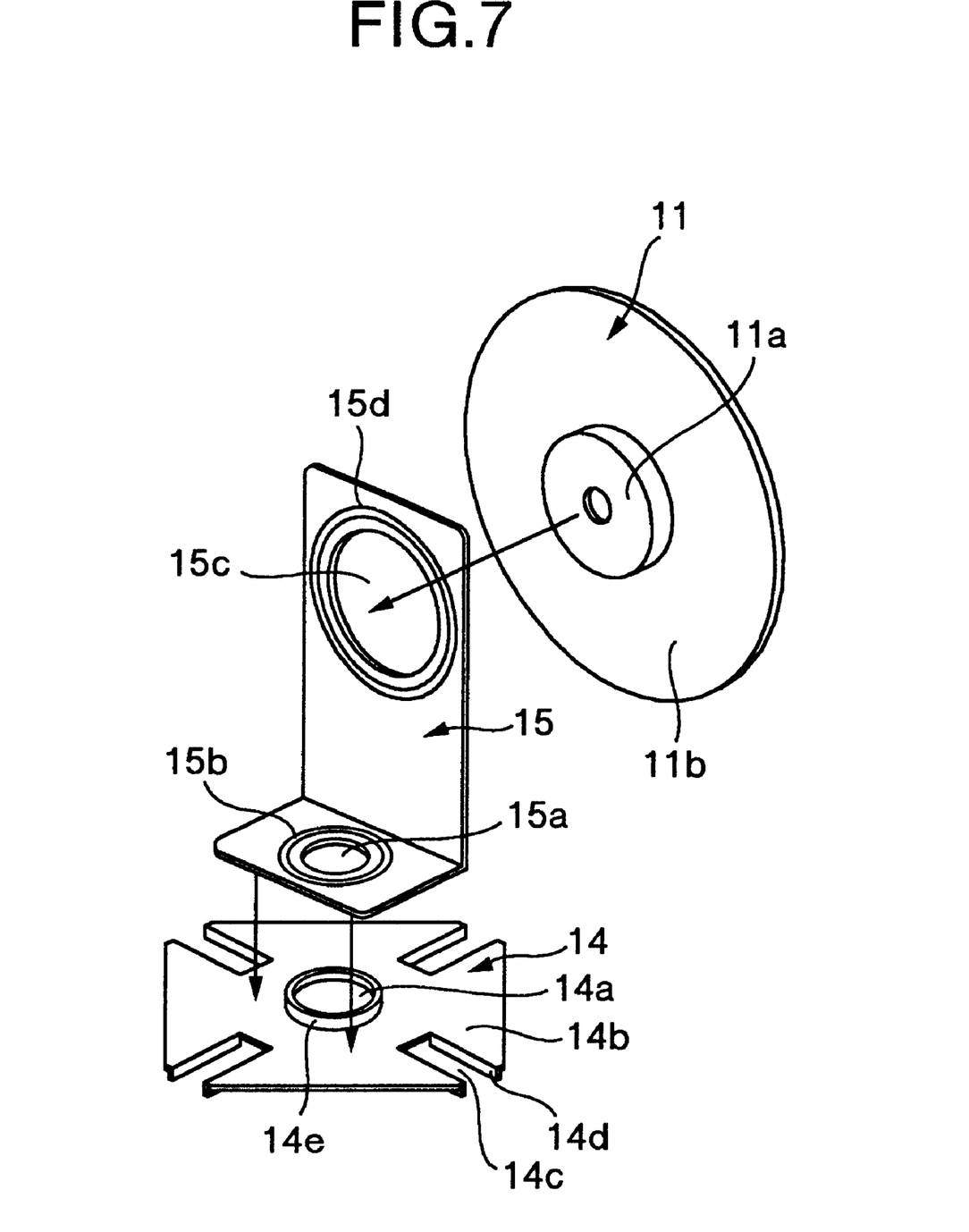
FIG. 7 is a perspective, exploded view showing a sealing plate, a lead terminal and a current collector of a second embodiment of the invention.

As shown in FIG. 7 (which is a schematic view), the current collector 14 includes the through hole 14a in the central portion thereof, a flat plate portion 14b, notch portions 14c, downwardly-projecting protuberances 14d disposed in contiguous relation to the notch portions 14c, and a projection 14e formed on and projecting upwardly from the central portion of this current collector. A hole 15a is formed through one end portion of the L-shaped lead terminal 15 to be welded to the current collector 14, and the area of this hole 15a is not smaller than the area of the through hole 14a in the current collector 14. A ring-shaped projection 15b is formed on the lead terminal, and is disposed around the hole 15a, and projects toward the current collector 14.

The ring-shaped projection 15b is fitted on the projection 14e, projecting upwardly from the central portion of the current collector 14, and is held against a central portion of the flat plate portion 14b of the current collector 14, and then a welding electrode is pressed against the upper side of the ring-shaped projection 15b, and welds the same to this flat plate portion.

A hole 15c is formed through the other end portion of the lead terminal 15 to be welded to the sealing plate 11, and this hole 15c has such an area that it can be fitted on a projected portion 11a of the sealing plate 11 containing a safety valve 12 therein. A ring-shaped projection 15d is formed around this hole 15c.

Then, the projected portion 11a of the sealing plate 11, containing the safety valve 12 therein, is inserted into the hole 15c in the lead terminal 15, and is fitted thereinto until the ring-shaped projection 15d of the lead terminal 15 is brought into contact with the lower surface 11b of the sealing plate 11, and in this condition, the ring-shaped projection 15d is welded to the sealing plate.

As a result, the displacement of the sealing plate 11 and the lead terminal 15 relative to each other can be prevented, and the positioning of the two relative to each other can be positively effected, and the projection welding can be carried out in a stable manner, and therefore the reliability is greatly enhanced. And besides, the lead terminal 15 is welded to the sealing plate 11 in such a manner that the lead terminal 15 surrounds the projected portion 11a of the sealing plate 11 over an entire periphery thereof, and therefore this structure can withstand severe vibrations, thus achieving enhanced durability.

Third Embodiment

Figure 8:
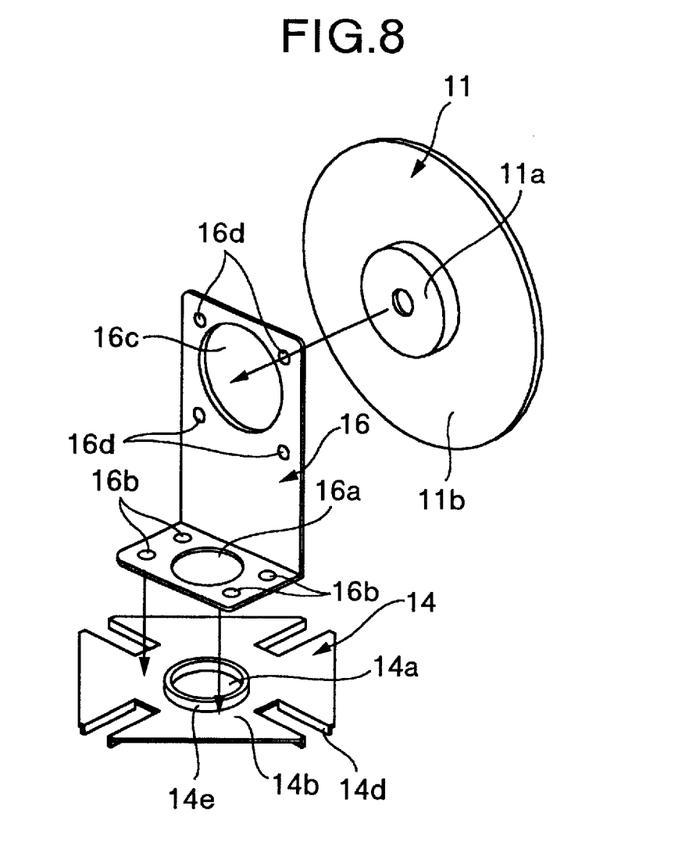
FIG. 8 is a perspective, exploded view showing a sealing plate, a lead terminal and a current collector of a third embodiment of the invention.

A third embodiment of a nickel-cadmium storage battery C, which is similar in construction to the first embodiment except the construction of an upper current collector 14 and a lead terminal 16, shown in FIG. 8, will be described.

A sintered-type nickel positive electrode plate 1 with a thickness of 1.0 mm, provided at its longitudinal edge with an exposed core member 3, and a paste-type cadmium negative electrode plate 2 with a thickness of 0.7 mm, provided at its longitudinal edge with an exposed core member 4, were prepared. The two electrode plates were spirally wound, with a separator 6 interposed therebetween, to provide an electrode plate assembly 5 (having a diameter of 30 mm and a height of 50 mm) such that the exposed core members 3 and 4 project a distance of about 1.5 mm from upper and lower ends of the electrode plate assembly 5, respectively.

The upper rectangular current collector 14 with a diagonal length of 27 mm, having a through hole formed through a central portion thereof, was arranged right above the upper end surface of the electrode plate assembly 5, whereas a lower rectangular current collector 8, which had the same diagonal length as that of the upper current collector 14, and was provided at a central portion thereof with a tongue for welding purposes, was held in contact with the exposed core member 4 provided at the lower end surface of the electrode plate assembly 5. In this condition, the upper and lower current collectors were welded respectively to the exposed core members 3 and 4 at a plurality of spots, using welding electrodes, and the lead terminal 16 was welded to the central portion of the upper current collector 14.

Then, the electrode plate assembly 5 was inserted into a metal casing 10, and a welding electrode was passed through the central hole in the current collector 14 to press the tongue provided at the central portion of the current collector 8, and this pressed part was welded to the inner bottom surface of the metal casing 10.

Then, a predetermined amount of an alkaline electrolyte was poured into the metal casing 10 through the central through hole in the current collector 14. A distal end portion of the lead terminal 16, secured to the current collector 14, was welded to a lower surface of a sealing plate 11 serving also as a positive electrode terminal, and the lead terminal 16 was bent into a U-shape, and an opening of the casing was closed in a sealed manner by the sealing plate 11, thus providing the nickel-cadmium storage battery C. This battery C had a diameter of 33 mm, a height of 61.5 mm and a nominal capacity of 5,000 mAh. Details of the construction of the upper portion of the battery C will be described in the following.

A hole 16a is formed through one end portion of the L-shaped lead terminal 16 to be welded to the current collector 14, and the area of this hole 16a is not smaller than the area of the through hole 14a in the current collector 14. This hole 16a is fitted on a projection 14e of the current collector 14, and the one end portion of the lead terminal 16 is held against a central portion of a flat plate portion 14b of the current collector 14, and then welding points (portions) 16b, disposed on this abutted portion, are laser welded to the current collector. It is to be noted that, in FIG. 8, numerals 16b show the locations here the welding is effected, and the locations are shown by small circles for convenience' sake and referred to herein as the "welding points". Similarly, welding points 16d which will be described in more detail hereunder are the locations where the welding is effected and the locations are shown by small circles for convenience' sake. These welding points may be replaced by a welding portion of a ring-shape or a semi-circular shape. Therefore, the welding points 16b can be spaced generally the same distance from current-collecting portions 14d of the current collector 14 welded to the electrode plate assembly, and also the paths of flow of the electric current can be made shortest.

A hole 16c is formed through the other end portion of the lead terminal 16 to be welded to the sealing plate 11. This hole 16c has such an area that it can be fitted on a projected portion 11a of the sealing plate 11 containing a safety valve 12 therein. The projected portion 11a of the sealing plate 11, containing the safety valve 12 therein, is inserted into the hole 16c in the lead terminal 16, and is fitted thereinto until that portion of the lead terminal 16, disposed around the hole 16c, is brought into contact with the lower surface 11b of the sealing plate 11, and in this condition, welding points (portions) 16d, disposed on this abutted portion, are welded to the sealing plate. These welding points may be replaced by a welding portion of a ring-shape or a semi-circular shape. As a result, the displacement of the sealing plate 11 and the lead terminal 16 relative to each other can be prevented, and the positioning of the two relative to each other can be positively effected, and the laser welding can be carried out in a stable manner, and therefore the reliability is greatly enhanced.

And besides, the lead terminal 16 is welded to the sealing plate 11 in such a manner that the lead terminal 16 surrounds the projected portion 11a of the sealing plate 11 over an entire periphery thereof, and therefore this structure can withstand severe vibrations, thus achieving enhanced durability.

Industrial Applicability

As described above, in accordance with the present invention, there can be provided the cylindrical storage battery with the spirally coiled electrode plate assembly which has such excellent output characteristics as to output large current, and has such a high reliability as to withstand severe vibrations.

What is claimed is:

1. A cylindrical storage battery comprising an electrode plate assembly including a pair of strip-shaped positive and negative electrode plates and a separator which are spirally wound in such a manner that a distal end portion of one of said electrode plates projects upwardly from said electrode plate assembly while a distal end portion of the other electrode plate projects downwardly from said electrode plate assembly; a pair of upper and lower current collectors welded respectively to the distal end portions of said electrode plates, each of said current collectors being in the form of a flat plate of a substantially rectangular or a substantially circular shape; a metal casing containing said electrode plate assembly, said current collectors and an alkaline electrolyte therein; a sealing plate closing an upper end of said casing in a sealed manner; and a lead terminal electrically connecting said upper current collector to said sealing plate; wherein a projected portion is formed on a lower surface of said sealing plate, one end portion of said lead terminal has a hole fitted on said projected portion of said sealing plate, a projection is formed on that portion of said lead terminal surrounding said hole, and is welded to the lower surface of said sealing plate, and the other end portion of said lead terminal is welded to said upper current collectors, wherein said projection, formed on said one end portion of said lead terminal, has a ring-shape.

2. A cylindrical storage battery comprising: an electrode plate assembly including a pair of strip-shaped positive and negative electrode plates and a separator which are spirally wound in such a manner that a distal end portion of one of said electrode plates projects upwardly from said electrode plate assembly while a distal end portion of the other electrode plate projects downwardly from said electrode plate assembly; a pair of upper and lower current collectors welded respectively to the distal end portions of said electrode plates, each of said current collectors being in the form of a flat plate of a substantially rectangular or a substantially circular shape; a metal casing containing said electrode plate assembly, said current collectors and an alkaline electrolyte therein; a sealing plate closing an upper end of said casing in a sealed manner; and a lead terminal electrically connecting said upper current collector to said sealing plate; wherein a projected portion is formed on a lower surface of said sealing plate, one end portion of said lead terminal has a hole fitted on said projected portion of said sealing plate, a projection is formed on that portion of said lead terminal surrounding said hole, and is welded to the lower surface of said sealing plate, one of a hole and a notch is formed through the other end portion of said lead terminal and a projection is formed on that portion of said lead terminal surrounding one of said hole and said notch, and is welded to said upper current collector, wherein said projection, formed on said one end portion of said lead terminal, has a ring-shape.

3. A cylindrical storage battery comprising: an electrode plate assembly including a pair of strip-shaped positive and negative electrode plates and a separator which are spirally wound in such a manner that a distal end portion of one of said electrode plates projects upwardly from said electrode plate assembly while a distal end portion of the other electrode plate projects downwardly from said electrode plate assembly; a pair of upper and lower current collectors welded respectively to the distal end portions of said electrode plates, each of said current collectors being in the form of a flat plate of a substantially rectangular or a substantially circular shape; a metal casing containing said electrode plate assembly, said current collectors and an alkaline electrolyte therein; a sealing plate closing an upper end of said casing in a sealed manner; and a lead terminal electrically connecting said upper current collector to said sealing plate; wherein a projected portion is formed on a lower surface of said sealing plate, one end portion of said lead terminal has a hole fitted on said projected portion of said sealing plate, a projection is formed on that portion of said lead terminal surrounding said hole, and is welded to the lower surface of said sealing plate, said upper current collector has a projection, the other end portion of said lead terminal has a second hole fitted on said projection on said upper current collector, and a projection is formed on that portion of said lead terminal surrounding said second hole, and is welded to said upper current collector, wherein said projection, formed on said one end portion of said lead terminal, has a ring-shape.

* * * * *